O. H. BUTLER.
PARING KNIFE.
APPLICATION FILED JULY 11, 1913.
1,110,884.
Patented Sept. 15, 1914.
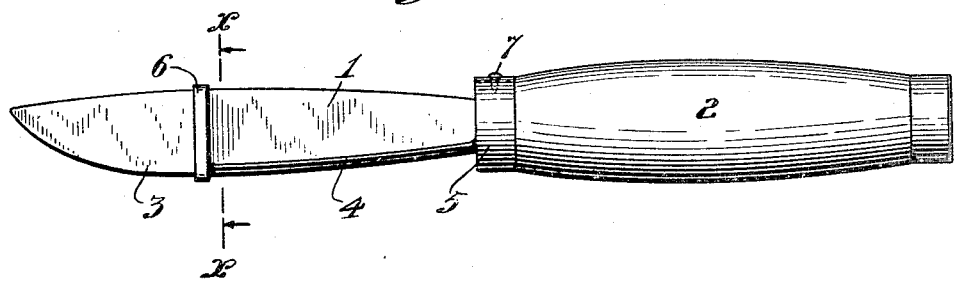
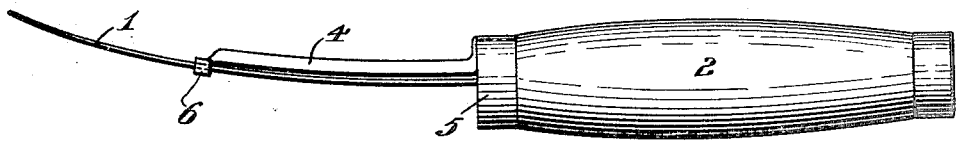
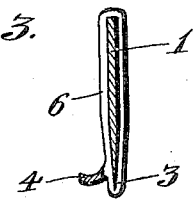
Witnesses:
H. S. Bull.
B. G. Richards
Inventor
Ossie H. Butler
By Joshua R. H. Potts
His Attorney

UNITED STATES PATENT OFFICE.

OSSIE H. BUTLER, OF CHICAGO, ILLINOIS.

PARING-KNIFE.

1,110,884.    Specification of Letters Patent.    Patented Sept. 15, 1914.

Application filed July 11, 1913. Serial No. 778,438.

*To all whom it may concern:*

Be it known that I, OSSIE H. BUTLER, a citizen of the United States, and a resident of the city of Chicago, county of Cook, and State of Illinois, have invented certain new and useful Improvements in Paring-Knives, of which the following is a specification.

My invention relates to improvements in paring knives and has for its object the provision of a knife of this character which is of simple construction, capable of economical manufacture and efficient in use.

The invention consists in the combinations and arrangements of parts hereinafter described and claimed.

The invention will be best understood by reference to the accompanying drawing forming a part of this specification, and in which, Figure 1 is a top plan view of a knife embodying my invention, Fig. 2, an edge view of the same, and Fig. 3, an enlarged section taken on line x—x of Fig. 1.

The preferred form of construction as illustrated in the drawing comprises a knife blade 1 which is provided with a suitable handle 2, said knife blade being curved in the direction of its length and at right angles to its sides as indicated in Fig. 2, the cutting edge 3 of said knife being also curved as shown in Fig. 1. A paring guard 4 is provided at one end with a ferrule or band 5 adapted to fit over the corresponding end of handle 2 and at its other end with a loop 6 adapted to fit snugly over the knife blade. A set screw 7 which passes through the band 5 and is threaded into the corresponding portion of handle 2 serves to maintain the guard in operative position. Guard 4, band 5 and loop 6 are all made integrally with each other and preferably of aluminum. The construction set forth is very simple, capable of economical manufacture and highly efficient in use. By curving the blade 1 in the direction of its length and at right angles to its sides the knife is better adapted to peeling or paring of potatoes or similar articles having depressions therein.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination, a knife blade; a handle on said blade; a ferrule on said handle; a guard integral with said ferrule, having a portion extending inwardly from said ferrule toward said blade and a portion spaced parallel with, close to and back of the cutting edge of said blade; and a loop extending around said blade intermediate the ends of the latter and formed integrally with said guard, substantially as described.

2. In combination, a knife blade; a handle on said blade; a ferrule on said handle; a guard integral with said ferrule, having portions extending inwardly from said ferrule toward said blade and a portion spaced parallel with, close to and back of the cutting edge of said blade, said last mentioned portion being arcual in cross section and disposed substantially perpendicular to said blade; and a loop extending around said blade intermediate the ends of the latter and formed integrally with said guard, substantially as described.

In testimony whereof I have signed my name to this specification in the presence of two subscribing witnesses.

OSSIE H. BUTLER.

Witnesses:
 JOSHUA R. H. POTTS,
 ARTHUR A. OLSON.

Copies of this patent may be obtained for five cents each, by addressing the "Commissioner of Patents, Washington, D. C."